March 10, 1953
W. H. HARSTICK
2,630,966
CENTRIFUGAL SEPARATOR WITH ADJUSTABLE
SUPPLY CAN BRACKET
Filed Sept. 8, 1950
2 SHEETS—SHEET 1
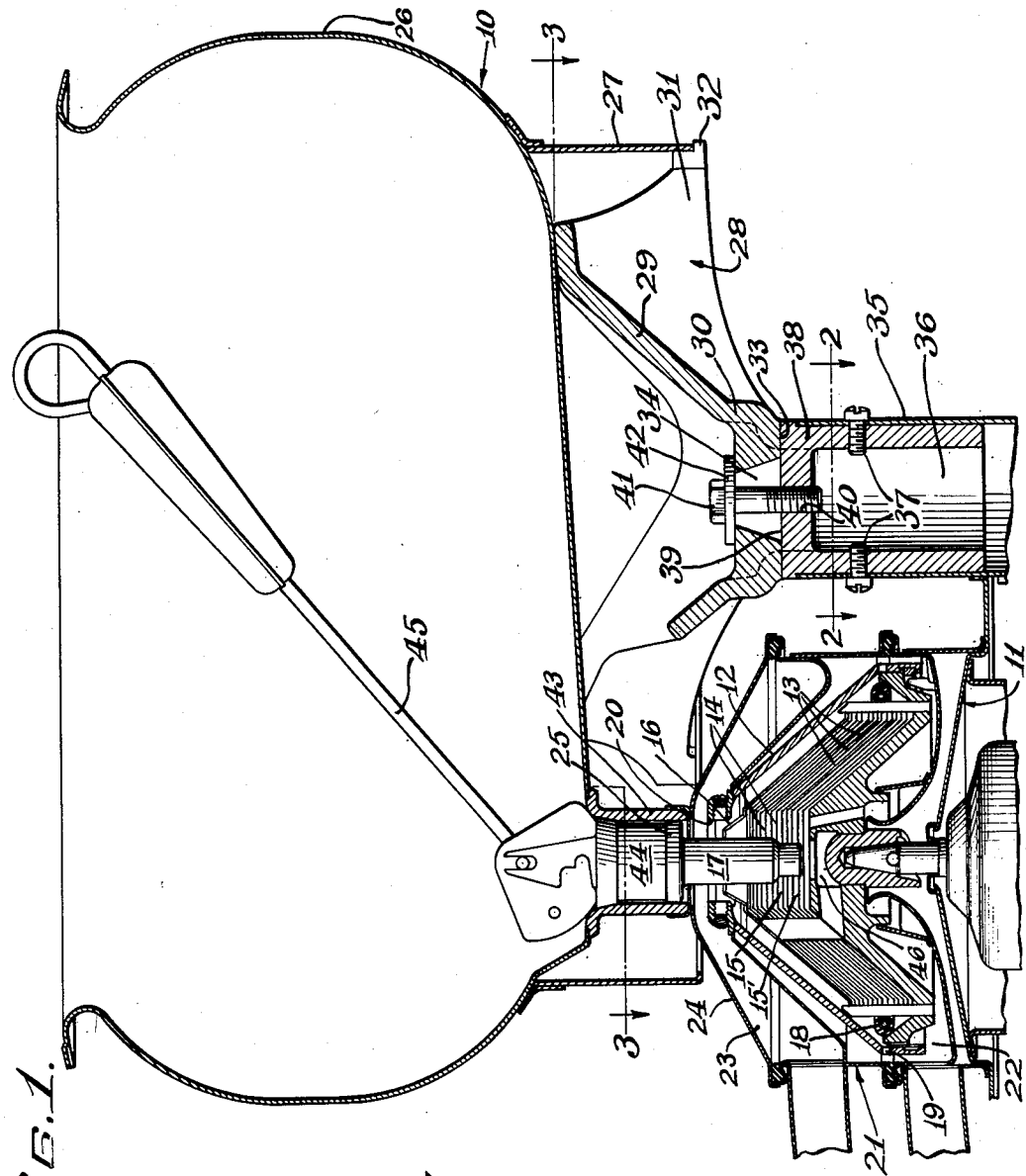
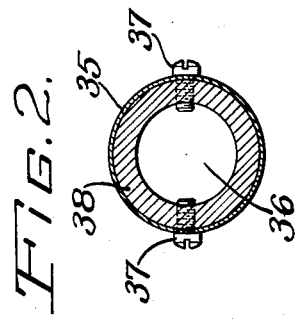
Inventor:
W. H. Harstick
Paul O. Pippel
Atty.

Patented Mar. 10, 1953

2,630,966

UNITED STATES PATENT OFFICE 2,630,966

CENTRIFUGAL SEPARATOR WITH ADJUSTABLE SUPPLY CAN BRACKET

William H. Harstick, Oak Park, Ill., assignor to International Harvester Company, a corporation of New Jersey Application September 8, 1950, Serial No. 183,809

4 Claims. (Cl. 233—1)

This invention relates to a centrifugal separator. More specifically this invention relates to an adjustable supply can bracket for adjustably supporting the supply can of a centrifugal separator.

In applicant's patent No. 2,504,261 patented April 18, 1950 a power washing centrifugal separator is disclosed. A power washing separator of that type consists essentially of a separating bowl having a peripheral discharge outlet. The peripheral discharge outlet is provided with a centrifugally operable valve ring operable to discharge washing liquid through the outlet for effectively flushing the interior parts of the bowl. The separator is provided with a plurality of superposed disks, each disk having a centrally disposed inner peripheral opening, the openings of the disks being in vertical registry to provide a liquid receiving passage. The separating bowl is suitably enclosed by means of a tinware structure, this structure having a cream receiving and a milk receiving chamber designed to receive liquid as it is discharged from the separating bowl.

The liquid to the separating bowl is supplied from a supply can situated above the separating bowl. The supply can is provided with a washing liquid discharge nozzle and a milk supply tube, both the tube and the discharge nozzle being in vertical registry with the cylindrical space formed by the inner peripheral edges of the superposed separating disks. In order to effectively separate whole milk and to properly wash the interior of the separating bowl, it is extremely desirable that the discharge nozzle and the milk supply tube be in proper vertical or axial alignment with respect to the vertical space and the inner peripheral edges of the disks. The adjustment must be such that it can be easily made by the operator with a minimum of effort. It is applicant's prime object therefore to provide an adjustable supply can bracket which may be quickly and readily adjusted in a lateral direction for positioning the washing liquid and discharge outlets of a supply can in proper relation with respect to the separating bowl.

A still further object is to provide an improved support for a supply can, the support including a spider-shaped bracket which is securely connected to the supply can against relative lateral displacement, the bracket having quick adjustable means for attaching the same to the stationary support of a centrifugal cream separator.

These and other objects of the invention will become further apparent when reading the specification in connection with the accompanying sheets of drawings.

In the drawings:

Fig. 1 is a sectional view in elevation through a centrifugal separator showing an improved adjustable supply can mounting means.

Fig. 2 is a cross sectional view through a supply can support, the view being taken substantially along the line 2—2 of Fig. 1.

Figure 3:
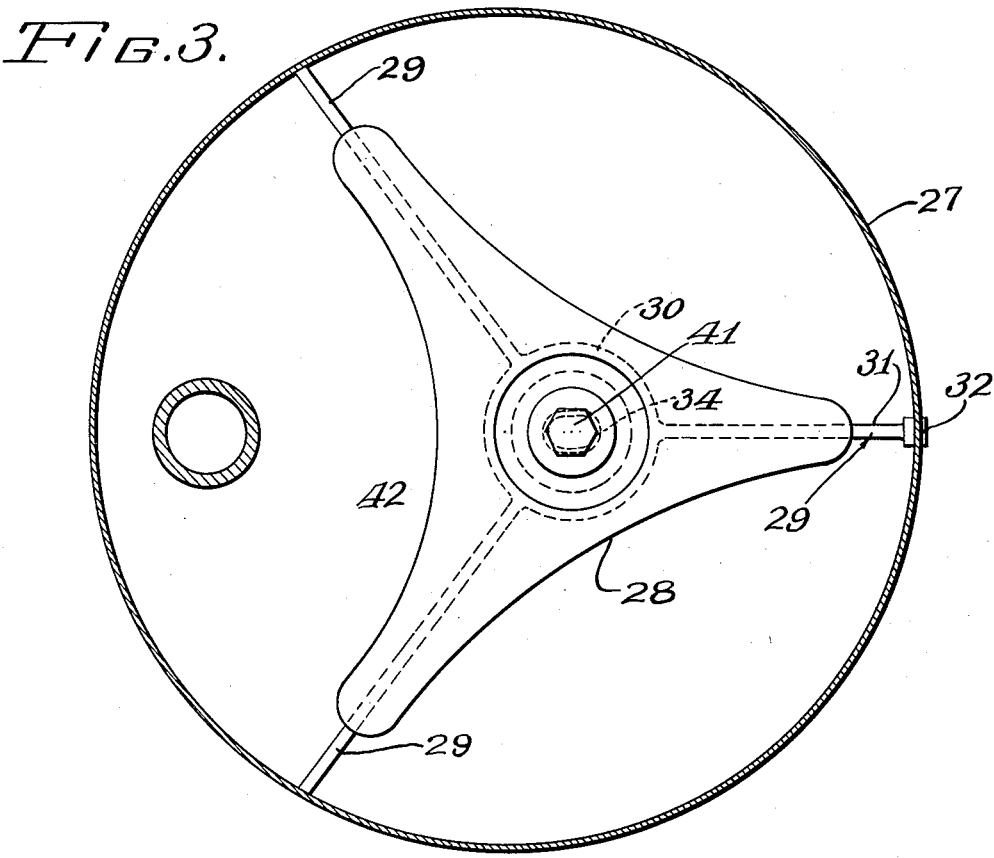
Fig. 3 is a sectional view taken along the line 3—3 of Fig. 1, this view showing portions of a supply can and a supply can bracket.
Figure 4:
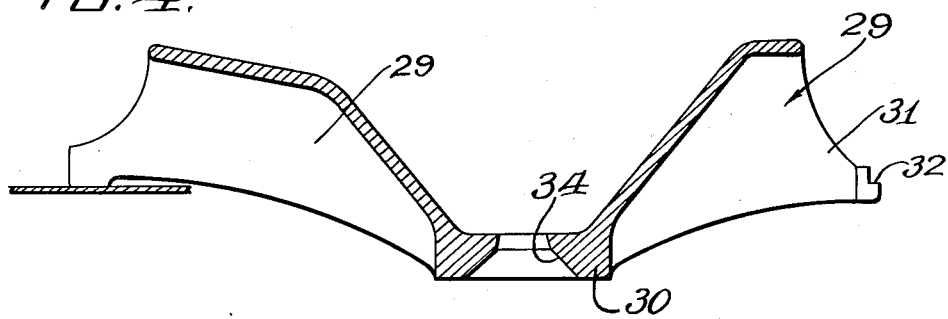
Fig. 4 is a cross sectional view through a supply can bracket showing certain specific details of construction.

Referring particularly to Fig. 1, a centrifugal separator is generally designated by the reference character 10. The separator 10 comprises a housing 11 on which a separating bowl 12 is rotatably mounted. The separating bowl 12 includes a plurality of conventional superposed separating disks 13, these disks 13 having openings 14 defined by inner peripheral edges 15, the openings 14 being in alignment to form a cylindrical space or passage 15'. A cover disk 16 is positioned over the separating disks 13, this cover disk including an opening 17 in registry with the cylindrical space 15'.

The separating bowl 12 is of the power washing type. This bowl includes a resilient centrifugal valve ring 18 which is adapted to seal and regulate a circumferentially extending opening 19 formed in the maximum periphery of the bowl 12. The uppermost surface of the bowl 12 is also provided with an opening 20, this opening being in alignment or communication with the opening 17 and the cylindrical space 15'.

The bowl 12 is enclosed within a tinware construction 21 having a milk chamber 22 and a cream receiving chamber 23, these chambers being designed to receive the liquid as it is discharged from the various openings in the separating bowl. The tinware construction 21 is provided with an upper closure plate 24 having a centrally disposed opening 25 in registry or in communication with the openings 17 and 20.

A supply can 26 is positioned above the bowl 12. The supply can 26 is provided with an annular depending skirt 27. A supply can bracket 28 supports the supply can 26. The bracket 28 includes a plurality of radially extending spider legs 29, these legs being connected to a base portion 30. As best indicated in Figs. 1 and 3, the supply can bracket 28 is provided with a projecting portion 31 having a shoulder portion 32 on which a portion of the annular skirt 27 is supported. As best shown in Fig. 3 the spider legs 29 extend outwardly into engagement with portions of the annular skirt 27 in such a manner that the skirt is securely held against lateral displacement with respect to the bracket 28. Since the skirt 27 is rigidly secured to the supply can 26, the supply can is thus also held against relative lateral displacement with respect to the bracket 28.

The base 30 of the bracket 29 is provided with a sliding surface 33, this surface being provided with a vertical elongated slot 34 extending through the base 30. A pedestal 35 is horizontally spaced with respect to the axis of the separating bowl 12. The pedestal 35 is of tubular construction as best shown in Figs. 1 and 2. A sleeve 36 is positioned within the pedestal 35 adjacent its upper end. Connecting screws 37 are provided for rigidly securing the sleeve 36 in place. The sleeve 36 includes a horizontal portion 38 having a flat sliding surface 39. A vertically threaded bore 40 disposed within the horizontal part 38. The bracket 29 is adjustably secured with respect to the sleeve 36 by means of a bolt 41 which, by means of a washer 42, securely clamps sliding surfaces 33 and 39 together. It can be seen that the supply can bracket 36 may quickly be laterally adjusted with respect to the pedestal 35 and sleeve 36 by merely unloosening the bolt 41. The slot 34 is sufficiently elongated so that a considerable degree of adjustment may be had.

The supply can is provided with a downwardly extending washing liquid nozzle 43 in which a milk supply tube 44 is positioned. The milk supply tube 44 extends downwardly through the openings 17 and 20 into the cylindrical space 15'. As shown in applicant's above mentioned patent, the milk supply tube 44 may be raised upwardly with respect to the washing liquid discharge nozzle 43 by simply raising upon the combined lever and float assembly 45. When the combined lever and float assembly 45 is raised upwardly to lift the milk discharge tube 44 from the washing liquid discharge nozzle, washing liquid courses down into the cylindrical space and against the inner peripheral edges of the disks, thus efficiently washing the same. Simultaneously water can course down through the milk discharge tube into a distributor chamber 46 of the separating bowl. It can thus be seen that it is extremely important to position the milk supply tube 44 and the washing liquid supply nozzle 43 in accurate alignment or registry with respect to the cylindrical space 15' and the distributor chamber 46. It is likewise important in the separating operation that the milk supply tube 44 is in proper axial alignment with respect to the distributor chamber 46. Proper alignment is readily accomplished by applicant's novel adjustable supply can bracket 28. Prior to either the separating or washing operation the operator merely loosens up the bolt 41 and adjusts the supply can bracket laterally with respect to the pedestal 35. The sliding surfaces 33 and 39 facilitate the adjustment so that minute adjustments may be made in lateral positioning. When the supply nozzle 43 and the tube 44 are in proper axial alignment with respect to the cylindrical space 15', the operator merely tightens the bolt 41 and thus the bracket 29 is held securely in place. Since, as above indicated, the supply can 26 is rigidly connected to the bracket 29 with respect to lateral displacement, the supply can is now properly supported for the separating or washing operation.

It can thus be seen that applicant has provided an improved construction for supporting a supply can, this construction permitting quick lateral adjustment to permit the discharge nozzles of a supply can to be properly aligned with respect to the interior parts of a separating bowl. It must be understood that changes and modifications may be made which do not depart from the spirit of the invention as disclosed and the scope thereof as defined in the appended claims.

What is claimed is:

1. A centrifugal separator comprising a housing structure, a rotatable separating bowl supported on said housing structure, said separating bowl having a plurality of separating disks positioned therein, the disks having centrally disposed inner peripheral openings and being positioned in superposed relation to provide a centrally disposed inlet space, means for supplying fluid to be separated to said space comprising a supply can positioned above the separating bowl, a discharge tube projecting downwardly from said supply can into said inlet space, means for supporting the supply can comprising a tubular pedestal offset laterally with respect to said bowl, a tubular sleeve positioned within said tubular pedestal adjacent its upper extremity, said sleeve having a flat horizontal sliding surface, a supply can bracket supporting said supply can, said bracket having a lower base provided with a flat surface adapted to engage the flat surface of the sleeve in sliding relation, said base having an elongated opening, means adjustably connecting said bracket to said pedestal, said means including a threaded member threaded into the sleeve and having a portion extending through the elongated opening and engaging the supply can bracket for adjustably securing the same to said pedestal.

2. A centrifugal separator comprising a housing structure, a rotatable separating bowl supported on said housing structure, said separating bowl having a plurality of separating disks positioned therein, the disks having centrally disposed inner peripheral openings and being positioned in superposed relation to provide a centrally disposed inlet space, means for supplying fluid to be separated to said space comprising a supply can positioned above the separating bowl, a discharge tube projecting downwardly from said supply can into said inlet space, means for supporting the supply can comprising a tubular pedestal offset laterally with respect to said bowl, a sleeve supported by the pedestal, said sleeve having a flat horizontal sliding surface, a supply can bracket supporting said supply can, said bracket having a lower base provided with a flat surface adapted to engage the flat surface of the sleeve in sliding relation, said base having an elongated opening, means adjustably connecting said bracket to said pedestal, said means including a threaded member threaded into the sleeve and having a portion extending through the elongated opening and engaging the supply can bracket for adjustably securing the same to said pedestal.

3. A centrifugal separator comprising a housing structure, a rotatable separating bowl supported on said housing structure, said bowl having a substantially centrally disposed inlet opening, means for supplying fluid to said inlet opening, said means including a supply can positioned above said bowl, a discharge tube connected to said can and projecting through said inlet opening, an annular skirt connected to said supply can, said skirt extending downwardly with respect to the can, means for adjustably supporting said supply can including a pedestal horizontally offset with respect to said separating bowl, a can bracket supported on said pedestal, said can bracket having a base portion, spider shaped legs on said base portion extending radially outwardly for engaging the annular skirt in supporting relation, a flat horizontal surface on said pedestal, said base portion being slidably supported on said horizontal surface, and means for adjustably connecting said base portion to said sliding surface whereby the can bracket may be adjusted laterally for adjusting the position of the supply can and the position of the discharge tube with respect to the inlet opening.

4. A centrifugal separator comprising a housing structure, a rotatable separating bowl supported on said housing structure, said separating bowl having an inlet opening, means for supplying material to said bowl, said means including a supply can having a discharge outlet adapted to be placed in registry with the inlet opening for delivering material to said bowl, means for supporting said supply can comprising a flat supporting portion having a threaded vertical bore, a bracket supported on said supporting portion, said bracket including a base having an elongated vertically extending slot, means on said bracket for supporting said supply can against lateral displacement with respect to the bracket, and a threaded member positioned within the slot, the threaded member having a head portion engaging the base portion and being threaded into the threaded bore for detachably securing the bracket to the supporting portion whereby the bracket and the supply can may be laterally adjusted for vertically aligning the discharge outlet with the inlet opening.

WILLIAM H. HARSTICK.

REFERENCES CITED

The following references are of record in the file of this patent:

UNITED STATES PATENTS

| Number | Name | Date |
|---|---|---|
| 636,383 | Hartman | Nov. 7, 1899 |
| 2,482,272 | Harstick et al. | Sept. 20, 1949 |

FOREIGN PATENTS

| Number | Country | Date |
|---|---|---|
| 187,549 | Great Britain | Oct. 26, 1922 |
| 605,625 | Germany | Nov. 15, 1934 |